United States Patent
Lee et al.

(10) Patent No.: US 10,552,926 B2
(45) Date of Patent: Feb. 4, 2020

(54) SYSTEMS AND METHODS FOR OBJECTIVELY DETERMINING RESTAURANT COST CHARACTERISTICS

(71) Applicant: MasterCard International Incorporated, Purchase, NY (US)

(72) Inventors: Edward M. Lee, Scarsdale, NY (US); Matthew Haisley, Monroe, NY (US)

(73) Assignee: MasterCard International Incorporated, Purchase, NY (US)

(*) Notice: Subject to any disclaimer, the term of this patent is extended or adjusted under 35 U.S.C. 154(b) by 613 days.

(21) Appl. No.: 15/171,989

(22) Filed: Jun. 2, 2016

(65) Prior Publication Data

US 2017/0352112 A1  Dec. 7, 2017

(51) Int. Cl.
*G06Q 50/12* (2012.01)
*G06Q 30/02* (2012.01)

(52) U.S. Cl.
CPC ......... *G06Q 50/12* (2013.01); *G06Q 30/0283* (2013.01)

(58) Field of Classification Search
CPC combination set(s) only.
See application file for complete search history.

(56) References Cited

U.S. PATENT DOCUMENTS

| | | | |
|---|---|---|---|
| 7,792,697 B2 | 9/2010 | Bhagchandani et al. | |
| 7,848,950 B2 | 12/2010 | Herman et al. | |
| 8,190,478 B2 | 5/2012 | Herman et al. | |
| 8,204,784 B2 | 6/2012 | Bhagchandani et al. | |
| 10,127,595 B1* | 11/2018 | Hipschman | G06Q 30/0629 |
| 2004/0225509 A1 | 11/2004 | Andre | |
| 2012/0109749 A1 | 5/2012 | Subramanian et al. | |
| 2012/0226551 A1 | 9/2012 | Bhagchandani et al. | |
| 2014/0089136 A1 | 3/2014 | Mukherjee et al. | |
| 2014/0278744 A1 | 9/2014 | Lo Faro et al. | |
| 2014/0279185 A1 | 9/2014 | Merz et al. | |
| 2016/0092946 A1* | 3/2016 | Patel | G06Q 30/0223 705/14.1 |
| 2017/0024718 A1* | 1/2017 | Feldschuh | G06Q 50/12 |

* cited by examiner

*Primary Examiner* — Scott A Zare
(74) *Attorney, Agent, or Firm* — Armstrong Teasdale LLP (57) ABSTRACT

A computer-implemented method for determining objective restaurant cost characteristics for one or more merchant restaurants. The method is implemented using a restaurant cost ratings (RCR) computing device. The method includes storing transaction data for a plurality of restaurant transactions. The method further includes receiving a request for one or more restaurant cost characteristics for one or more merchant restaurants. The method also includes determining the one or more restaurant cost characteristics for the one or more merchant restaurants based on the transaction data stored in the memory. The method further includes transmitting the one or more restaurant cost characteristics for the one or more merchant restaurants to a remote computing device.

21 Claims, 8 Drawing Sheets

SYSTEMS AND METHODS FOR OBJECTIVELY DETERMINING RESTAURANT COST CHARACTERISTICS

BACKGROUND OF THE DISCLOSURE

The field of the disclosure relates generally to methods and systems for objectively determining restaurant meal costs, and, more particularly, to objectively determining restaurant cost characteristics based on transaction data resulting from payment transactions made by customers at restaurants.

Restaurant customers today are provided with an increasing number of different types of restaurants. New restaurants continually open and concepts can vary from pizza chains to fine sushi restaurants to breakfast cafes. For example, in many cities, customers have hundreds if not thousands of restaurant options. There are some known computer-related applications that allow customers to search and organize restaurant options within a geographic area. However, when the restaurant options are narrowed by restaurant category or cuisine within the known systems, there may still be an inconveniently large number of restaurant options presented to the customers. One method that some customers may use to select a restaurant is based upon cost. Unfortunately, there are no known systems that are capable of objectively rating restaurants based on cost.

At least some known websites enable customers or even non-customers to rate restaurants based on cost, which can be reviewed online by potential customers. However, at least one problem that arises with relying on the reviews of other customers (or non-customers) is that some customers have subjective views on cost. For example, a customer may believe that a particular restaurant was costly when it was actually quite low for a comparable restaurant in that area, or vice versa. Additionally, some customers may view a restaurant as costly after a negative experience or low-priced after a positive experience. Furthermore, cost ratings provided by customers on these known websites represent only a small portion of the population and can become outdated over time. Also, in some cases, non-customers may post reviews of restaurants for personal reasons and those reviews are not based on actual experiences with the restaurants.

Self-reporting by restaurants is similarly problematic in that a restaurant may misreport or misrepresent the average cost of a meal. For many customers, the aforementioned issues can make determining the actual cost of a restaurant unreliable since the information presented is not objective. In addition, these reviews are self-reported and may not account for cost variations depending on a time of day or seasonal factors that may impact the cost of the restaurant.

BRIEF DESCRIPTION OF THE DISCLOSURE

A computer-implemented method for determining objective restaurant cost characteristics for one or more merchant restaurants is provided. The method is implemented using a restaurant cost ratings (RCR) computing device in communication with a network and a remote computing device. The RCR computing device includes a processor and a memory. The method further includes storing, in the memory, transaction data for a plurality of restaurant transactions. The RCR computing device is configured to use the transaction data to determine restaurant cost characteristics for one or more merchant restaurants. The method also includes receiving, by the RCR computing device, a request for one or more restaurant cost characteristics for one or more merchant restaurants. The method further includes determining, by the RCR computing device, the one or more restaurant cost characteristics for the one or more merchant restaurants based on the transaction data stored in the memory. The method also includes transmitting, by the RCR computing device, the one or more restaurant cost characteristics for the one or more merchant restaurants to the remote computing device.

A restaurant cost ratings (RCR) computing device for determining objective restaurant cost characteristics for one or more merchant restaurants is provided. The RCR computing device is in communication with a network and a remote computing device. The RCR computing device includes a processor and a memory coupled to the processor. The processor is configured to store, in the memory, transaction data for a plurality of restaurant transactions. The processor is also configured to use the transaction data to determine restaurant cost characteristics for one or more merchant restaurants. The processor is further configured to receive a request for one or more restaurant cost characteristics for one or more merchant restaurants. The processor is also configured is determine the one or more restaurant cost characteristics for the one or more merchant restaurants based on the transaction data stored in the memory. The processor is further configured to transmit the one or more restaurant cost characteristics for the one or more merchant restaurants to the remote computing device.

Computer-readable storage media having computer-executable instructions embodied thereon is provided. When executed by at least one processor associated with a restaurant cost ratings (RCR) computing device, the computer-executable instructions cause the processor to store, in the memory, transaction data for a plurality of restaurant transactions. The computer-executable instructions cause the processor to use the transaction data to determine restaurant cost characteristics for one or more merchant restaurants. The computer-executable instructions further cause the processor to receive a request for one or more restaurant cost characteristics for one or more merchant restaurants. The computer-executable instructions also cause the processor to determine the one or more restaurant cost characteristics for the one or more merchant restaurants based on the transaction data stored in the memory. The computer-executable instructions also cause the processor to transmit the one or more restaurant cost characteristics for the one or more merchant restaurants to a remote computing device.

BRIEF DESCRIPTION OF THE DRAWINGS

FIGS. 1-8 show example embodiments of the methods and systems described herein.

DETAILED DESCRIPTION OF THE DISCLOSURE

In at least some cardholder-initiated payment transactions, a cardholder (e.g., a person or entity using a payment card such as a credit card, a debit card, or a prepaid card) may purchase meals at restaurants. Such payment transactions generate transaction data that can be analyzed to objectively determine cost characteristics of restaurants.

The systems and methods described herein include a restaurant cost ratings (RCR) computing device for determining objective real-time restaurant cost characteristics based upon payment transactions made by customers at restaurants. The RCR computing device includes a processor and a memory. The RCR computing device is configured to receive transaction data for a plurality of customers from a payment network. In the example embodiment, the customers are cardholders that use financial transaction cards to initiate payment transactions with merchants. The RCR computing device is configured to identify payment transactions made at merchant restaurants. For each payment transaction made at a merchant restaurant, the transaction data includes one or more of a name of the restaurant, a merchant restaurant ID, a location of the restaurant, a date and a time that the payment was made, a transaction size, and a transaction amount. The RCR computing device determines cost characteristics for each merchant restaurant based on the received transaction data.

In the example embodiment, the RCR computing device is configured to receive merchant transaction data from a payment network. Transaction data is generated as a result of a plurality of transactions initiated by cardholders at merchants. When a financial transaction card is used by a cardholder at a transaction terminal of a merchant, transaction data is typically transmitted by a merchant server through a payment network (e.g., Banknet®, a payment card interchange network, or MasterCard's Global Payment System communications network) to a central processing hub. At least some transaction data is associated with merchant restaurant transactions (i.e., cardholder transactions made at restaurants). The RCR computing device is configured to detect that transaction data is associated with a merchant restaurant based upon a merchant restaurant identification (ID) assigned to each merchant restaurant. Once a merchant is identified as a restaurant, the RCR computing device is configured to store the transaction data, which at least includes a name of the restaurant, the merchant restaurant ID, and a transaction amount representing a cost of a meal at the restaurant, in a table within the memory along with any other previously stored transaction data for the merchant restaurant.

In the example embodiment, the RCR computing device is in communication with at least one user computing device that includes a user interface. The user interface includes, but is not limited to, an input device and an output device to receives data from and transmit data to the RCR computing device. As described below, the RCR computing device generates a cost rating signal for a merchant restaurant based on received transaction data.

The RCR computing device is configured to determine an average transaction amount for a merchant restaurant based upon the transaction amounts stored in memory for the merchant restaurant. The average transaction amount is determined by the RCR computing device using (1) a straight average, a mathematical average, or an other quantitative method calculated over a predetermined period of time, or (2) a mode or a median transaction amount calculated over a predetermined period of time. In one or more embodiments, a user may transmit, via a user interface, a start date and an end date for the predetermined period of time. In some further embodiments, the RCR computing device, when determining the average transaction amount, is configured to identify and disregard abnormally large or small transactions that may skew the average.

The RCR computing device is further configured to convert the average transaction amount into a restaurant cost rating. Each average transaction amount falls into a predefined price range (i.e., $0-$10.00, $10.01-$20.00, etc.) with each price range being represented by one or more predefined labels or symbols. The predefined labels or symbols represent the restaurant cost rating. For example, the restaurant cost rating for a restaurant may be represented as a tiered indicator such as $ to $$$$$ depending on whether the average transaction amount for the restaurant falls into a low price range (e.g., $) or a high price range (e.g., $$$$$).

The RCR computing device is configured to format and display one or more average transaction amounts and/or one or more restaurant cost ratings, along with additional cost characteristics explained below, to a user on a user interface. For example, a column of one or more restaurant names may be displayed on the user interface, wherein each restaurant name has an associated horizontal row including at least the restaurant cost rating for that restaurant. In a further example, the user can enter a restaurant name into the user interface to view the restaurant cost rating for that restaurant. If the user enters a restaurant name where the average transaction amount for the restaurant falls into a low price range (i.e., $0-$10.00), the RCR computing device will return a restaurant cost rating of "$."

In the example embodiment, the transaction data includes additional data such as, but not limited to, one or more of the following: a party size, a transaction size, a time and a date of the transaction, a food category (e.g., Indian, Chinese, etc.), a restaurant type (causal, upscale, etc.), and a location (i.e., an address) of the merchant restaurant. The additional transaction data is stored in the table within the memory and is associated with the merchant restaurant ID. In some embodiments, where additional data is missing, for example, the restaurant type is not included in the transaction data, the missing additional data is pre-programmed into the table within the memory.

The RCR computing device is further configured to filter the restaurants in memory based on queries entered into the user interface by the user. For example, the user can query the cost ratings for restaurants in a particular area. In response, the RCR computing device receives the query and determines the cost ratings for restaurants in the particular area using the transaction data stored in memory. More particularly, the user may, for example, enter a city into the user interface, whereupon the RCR computing device retrieves the relevant transaction data from memory to determine and display the cost ratings for merchant restaurants within the entered city. The user could also enter, for example, a time of day (i.e., "8:00 a.m." or "breakfast") into the user interface to view the restaurant cost ratings for the entered time of day. The user may further narrow the results by, for example, entering a city and a time of day into the user interface, whereupon the RCR computing device is configured to determine the cost ratings for the entered time of day for merchant restaurants in the city. The RCR computing device analyzes the queries entered into the user interface by the user using keywords, natural language processing, information retrieval, knowledge representation and reasoning, and/or machine learning technologies.

In the example embodiment, the RCR computing device is further configured to determine, based on the transaction data stored in memory, additional restaurant cost characteristics for each restaurant, including, but not limited to, a dollar range for the transactions, an average transaction size (e.g., average number of items ordered), and a cost index (e.g., how much, in percentage terms, the average transaction amount for a given restaurant is over or under the average transaction amount for similar restaurants). In one or more embodiments, the RCR computing device is further configured to filter the transaction data described above based on queries entered by the user into the user interface. For example, the user can obtain restaurant cost ratings and cost indexes for all restaurants within a particular city during a particular season (e.g., tourist season when restaurants may charge more for purchases or winter season when restaurants may charge less for purchases) by entering relevant terms into the user interface.

In some embodiments, the RCR computing device receives supplemental data on merchant restaurants (e.g., third-party restaurant ratings, restaurant reviews, cost information, etc.) transmitted by a third party. The supplemental data is transfer by a third party server to the RCR computing device, where it is stored in the memory. The RCR computing device may utilize at least a portion of the supplemental data when, for example, providing restaurant characteristics to users or filtering the transaction data.

In further embodiments, the RCR computing device is configured to determine location information for users (e.g., cardholders, customers, etc.) relative to merchant restaurants stored in memory. In one embodiment, the RCR computing device is configured to receive location information from a user computing device having a global positioning systems (GPS) capability or other location based technology. In another embodiment, the RCR computing device is configured to receive location information from a user based on an address voluntarily provided by the user. In some embodiments, the user computing device is a mobile computing device, such as a smartphone. Upon receipt of the location information, the RCR computing device accesses restaurant location information in the memory to identify restaurants that are within the proximity of the cardholder. The RCR computing device can use the determined location information to order a listing of merchants by distance from a current location of the user.

In another embodiment, the RCR computing device is further configured to transmit to the user computing device, over the internet, an alert and/or a notification that displays one or more restaurant cost characteristics for at least one merchant restaurant, including at least one or more of a restaurant name, a restaurant location, a restaurant cost rating, an average transaction amount, a cost index, a food category, a restaurant type, directions to the restaurant, a webpage associated with the restaurant, and/or a link to a webpage associated with the restaurant. In one embodiment, the alert and/or the notification is transmitted when the user is determined to be within a predefined distance to a merchant restaurant. The alert and/or the notification is transmitted over a wireless communication channel to the user computing device based upon the proximity of the user computing device to the restaurant. The alert and/or the notification activate the user computing device to cause the one or more restaurant cost characteristics to display on the user computing device. In some embodiments, the alert and/or the notification enables a connection via an URL to the RCR computing device over the Internet, such that the user computing device is connected to the RCR computing device. When the alert and/or the notification activates the user computing device to cause the restaurant cost characteristics to display on the user computing device, the user computing device comes online. The RCR computing device controls the user computing device to cause the display of the restaurant cost characteristics on the user computing device, along with any additional information. In some embodiments, the RCR computing device continues to transmit notifications to the user computing device regarding, for example, directions to the merchant restaurant, additional recommended merchant restaurants, and the like.

In a still further embodiment, the RCR computing device is configured to transmit restaurant recommendations to a cardholder based upon at least one of a transaction history of the cardholder, a transaction history for a plurality of cardholders, preferences provided by the cardholder, a location of the cardholder, and restaurant cost characteristics. The recommendations are determined based on the transaction data stored in the memory. Each recommendation includes at least one restaurant cost characteristic associated with each recommended merchant restaurant. For example, if the cardholder frequents a certain category of restaurants, the RCR computing device can recommend similar, possibly cheaper, restaurants to the cardholder. The recommendations can be transmitted in a variety of formats, such as, but not limited to, text messages, e-mails, and/or notifications transmitted over a wireless communication channel to a user computing device. In some embodiments, the user computing device is a mobile computing device, such as a smartphone, and the recommendations appear on the user computing device as push notifications. In one embodiment, the RCR computing device controls the user computing device by causing the user computing device to display one or more restaurant recommendations.

An example implementation of the RCR computing device may include a cardholder, a merchant restaurant, a RCR computing device, and a user accessing a user interface. A payment transaction is made by the cardholder at the merchant restaurant. Transaction data, including at least a merchant restaurant ID and a transaction amount, is transmitted over the payment network and received by the RCR computing device. A user, desiring to determine restaurant cost ratings for breakfast during peak tourist season for all restaurants located within a particular city, would enter the name of the city, the season or dates, and a meal time into the user interface. The RCR computing device, using the transaction data stored in memory, determines the restaurant cost ratings for the entered query and provides the user with a list of restaurants in the city, whereupon each restaurant includes a cost rating for breakfast time during peak tourist season.

The methods and systems described herein may be implemented using computer programming or engineering techniques including computer software, firmware, hardware or any combination or subset thereof, wherein the technical effect is achieved by performing at least one of: (a) receiving at least one transaction data signal including data on a plurality of financial transactions processed by the payment processing network for a plurality of merchants; (b) identifying merchant restaurant transaction data based on the plurality of financial transactions from a plurality of cardholders made at merchant restaurants; (c) processing the merchant restaurant transaction data to determine objective, real time restaurant cost characteristics for a plurality of merchant restaurants; (d) providing users with real time restaurant cost characteristics; (e) recommending at least one merchant restaurant to a user and/or a cardholder; (f) transmitting an alert and/or a notification to a user computing device, thereby activating the user computing device to cause a restaurant cost ratings alert to display on the user computing device; and (h) controlling the user computing device by causing the user computing device to display at least one restaurant cost characteristic. More specifically, a restaurant cost ratings (RCR) device described herein is specially programmed with computer code to perform the above processes. The technical effects described herein apply to the technical field of determining objective, real time restaurant cost ratings. The systems and methods described herein provide the technical advantage of analyzing a high volume of payment transaction signals processed by a payment processing network and determining, based at least in part on the payment transaction signals, objective, real time cost ratings for restaurants.

Described herein are computer systems such as restaurant cost ratings (RCR) devices and user computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. In addition, consumer card account behavior can include but is not limited to purchases, management activities (e.g., balance checking), bill payments, achievement of targets (meeting account balance goals, paying bills on time), and/or product registrations (e.g., mobile application downloads).

The systems and processes are not limited to the specific embodiments described herein. In addition, components of each system and each process can be practiced independent and separate from other components and processes described herein. Each component and process also can be used in combination with other assembly packages and processes.

The following detailed description illustrates embodiments of the disclosure by way of example and not by way of limitation. It is contemplated that the disclosure has general application to rating the expensiveness of restaurants based on information derived from payment transactions.

Figure 1:
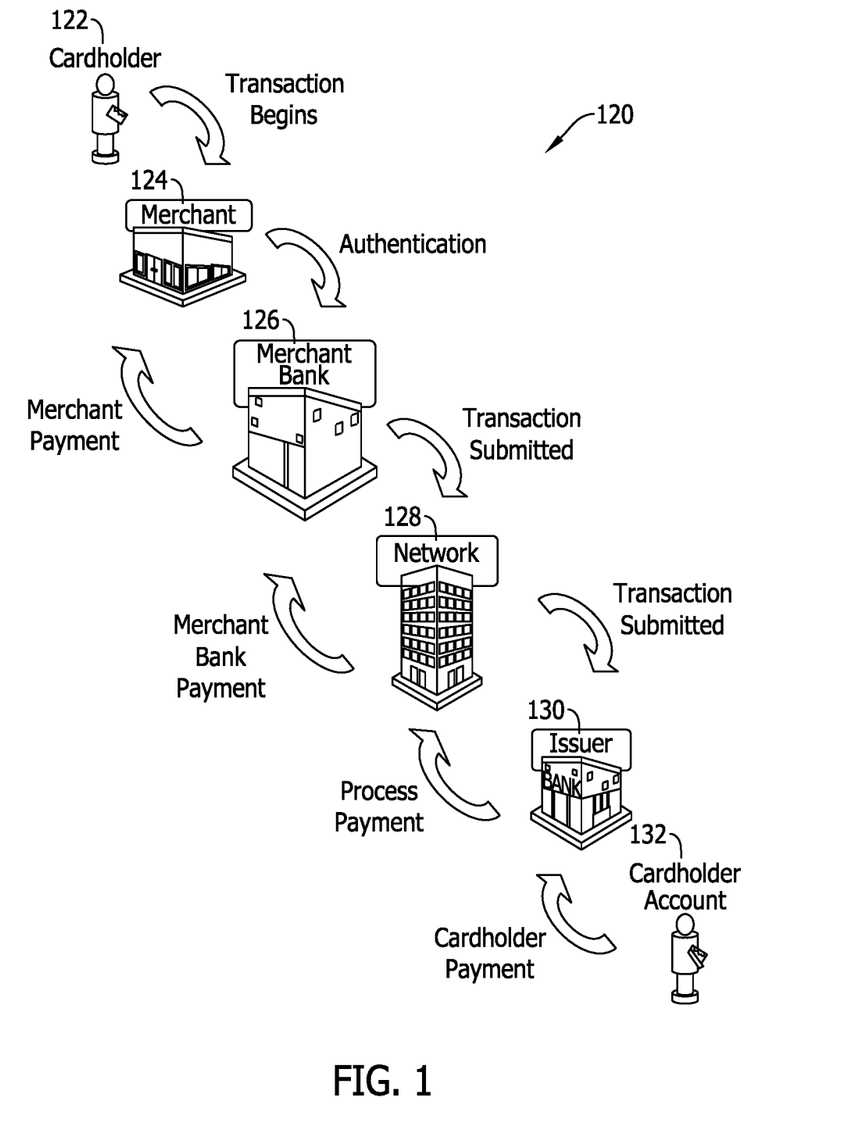
FIG. 1 is a schematic diagram illustrating an example multi-party payment card industry system for enabling payment-by-card transactions.

FIG. 1 is a schematic diagram illustrating an example multi-party payment card system 120 for enabling payment-by-card transactions between merchants 124 and card issuers 130. The present disclosure relates to payment card system 120, such as a credit card payment system using the MasterCard® payment card system payment network 128 (also referred to as an "interchange" or "interchange network"). MasterCard® payment card system payment network 128 is a proprietary communications standard promulgated by MasterCard International Incorporated® for the exchange of financial transaction data between financial institutions that are members of MasterCard International Incorporated®. (MasterCard is a registered trademark of MasterCard International Incorporated located in Purchase, N.Y.).

In payment card system 120, a financial institution such as an issuer 130 issues a payment account card, such as a credit card account or a debit card account, to a cardholder 122, who uses the payment account card to tender payment for a purchase from a merchant 124, including a restaurant merchant. To accept payment with the payment account card, merchant 124 must normally establish an account with a financial institution that is part of the financial payment system. This financial institution is usually called the "merchant bank" or the "acquiring bank" or "acquirer bank" or simply "acquirer". When a cardholder 122 tenders payment for a purchase with a payment account card (also known as a financial transaction card), merchant 124 requests authorization from acquirer 126 for the amount of the purchase. The request may be performed over the telephone, but is usually performed through the use of a point-of-interaction terminal, which reads the cardholder's account information from the magnetic stripe on the payment account card or EMV chip and communicates electronically with the transaction processing computers of acquirer 126. Alternatively, acquirer 126 may authorize a third party to perform transaction processing on its behalf. In this case, the point-of-interaction terminal will be configured to communicate with the third party. Such a third party is usually called a "merchant processor" or an "acquiring processor." In some instances, a merchant (e.g., merchant 124) stores payment card information associated with a cardholder (e.g., cardholder 122) and requests authorization from acquirer 126 using the stored payment card information, rather than reading the cardholder's account information from the payment card itself (i.e., a card-on-file (COF) transaction).

Using payment card system payment network 128, the computers of acquirer 126 or the merchant processor will communicate with the computers of issuer 130, to determine whether the cardholder's account 132 is in good standing and whether the purchase is covered by the cardholder's available credit line or account balance. Based on these determinations, the request for authorization will be declined or accepted. If the request is accepted, an authorization code is issued to merchant 124.

When a request for authorization is accepted, the available credit line or available balance of cardholder's account 132 is decreased. Normally, a charge is not posted immediately to a cardholder's account because bankcard associations, such as MasterCard International Incorporated®, have promulgated rules that do not allow a merchant to charge, or "capture," a transaction until goods are shipped or services are delivered. When a merchant ships or delivers the goods or services, merchant 124 captures the transaction by, for example, appropriate data entry procedures on the point-of-interaction terminal. If a cardholder cancels a transaction before it is captured, a "void" is generated. If a cardholder returns goods after the transaction has been captured, a "credit" is generated.

For PIN debit card transactions, when a request for authorization is approved by the issuer, the cardholder's account 132 is decreased. Normally, a charge is posted immediately to cardholder's account 132. The bankcard association then transmits the approval to the acquiring processor for distribution of goods/services, or information or cash in the case of an ATM.

After a transaction is captured, the transaction is cleared and settled between merchant 124, acquirer 126, and issuer 130. Clearing refers to the communication of financial data for reconciliation purposes between the parties. Settlement refers to the transfer of funds between the merchant's account, acquirer 126, and issuer 130 related to the transaction.

Figure 2:
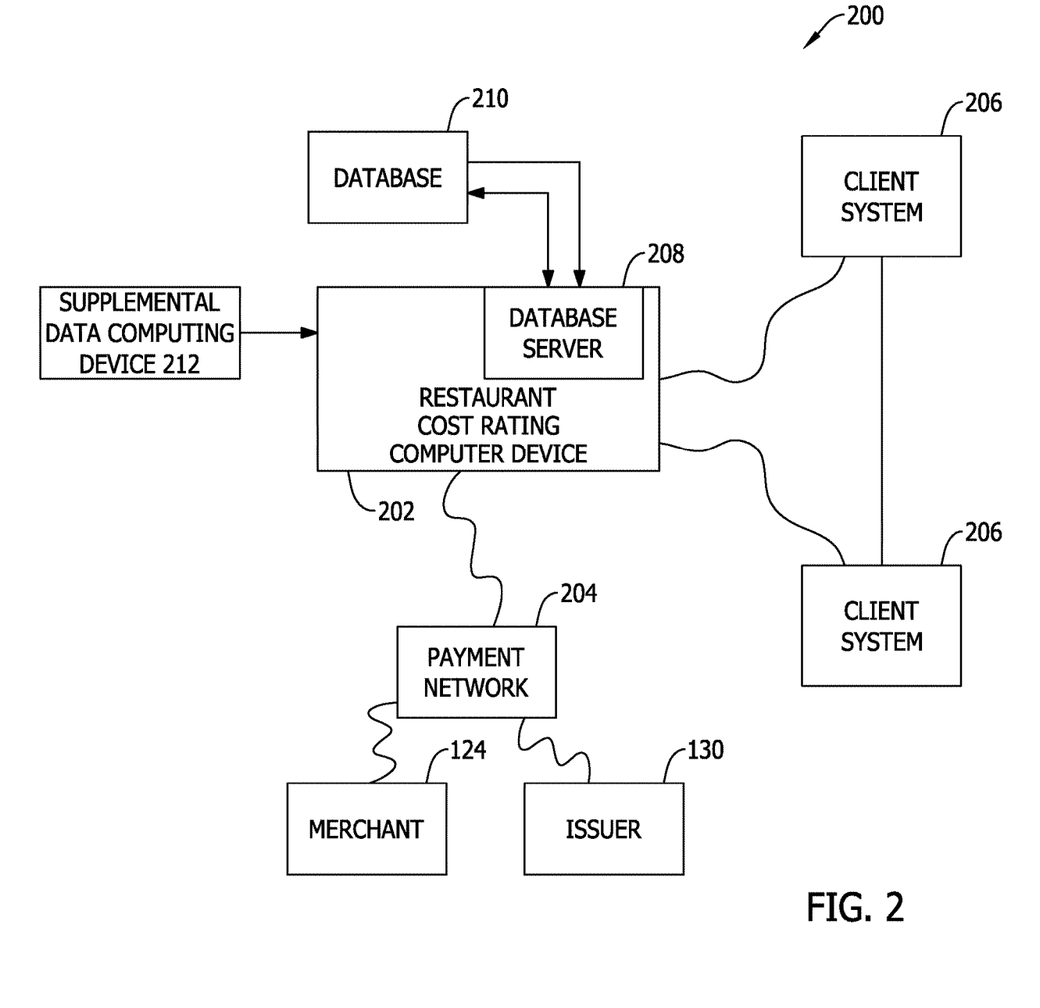
FIG. 2 is a block diagram of an example payment card system including a restaurant cost ratings (RCR) computing device, in accordance with one embodiment of the present disclosure.

FIG. 2 is a simplified block diagram of an example computer system 200 used with a RCR computing device 202 in accordance with one embodiment of the present disclosure. In the example embodiment, system 200 is use for at least transmitting and receiving transaction data, identifying merchant restaurants, determining restaurant cost characteristics, and formatting and transmitting the restaurant cost characteristics to users.

System 200 includes a RCR computing device 202 and a payment processing server computing device 204 and a plurality of client subsystems (i.e., user computing devices), also referred to as client systems 206 or client computing devices, connected to payment processing server computing device 204. In one embodiment, client systems 206 are computers including a web browser, such that RCR computing device 202 is accessible to client systems 206 using the Internet. Client systems 206 are interconnected to the Internet through many interfaces including a network, such as a local area network (LAN) and/or a wide area network (WAN), dial-in connections, cable modems, wireless-connections, and special high-speed ISDN lines. Client systems 206 may be any device capable of interconnecting to the Internet including a web-based phone, personal digital assistant (PDA), or other web-connectable equipment. In one embodiment, client computing device 206 includes a cardholder computing device (e.g., a smartphone, a tablet, or other computing device), or any other computing device capable of communicating with payment processing server computing device 204 and/or RCR computing device 202. A database server 208 is connected to a database 210, which contains information on a variety of matters, as described below in greater detail. In one embodiment, database 210 is stored on RCR computing device 202 and may be accessed by potential users at one of client systems 206 by logging onto RCR computing device 202 through one of client systems 206. In any alternative embodiment, database 210 is stored remotely from RCR computing device 202 and may be non-centralized. Payment transaction data, average transaction amounts, restaurant cost ratings, and other transaction data, such as, but not limited to, a location of the restaurant, a date and a time that the payment was made, a transaction size, and a transaction amount, are stored in database 210.

Additionally, in some embodiments, RCR computing device 202 receives supplemental data from supplemental data computing devices 212. In some embodiments, supplemental data includes data (e.g., third-party restaurant ratings, restaurant reviews, cost information, etc.) on restaurants from the third party. In other embodiments, the supplement data includes GPS location information and RCR computing device 202 is configured to determine location information for each of the plurality of merchants relative to a predetermined selectable location and/or a current location of a user and/or cardholder. For example, a cardholder that uses a mobile computing device having a GPS capability can use the determined location information to order a listing of merchants by distance from a current location of cardholder or a location chosen by cardholder, for example, a hotel in a distant city where cardholder will be staying during an upcoming trip. In another example, the RCR computing device can use the GPS location information to determine a restaurant in proximity to the user and transmit a notification to the user regarding the restaurant cost rating for the restaurant. Supplemental data computing devices 212, in at least some embodiments, are a plurality of different computing devices, each associated with a different source of supplemental data (e.g., a third-party business computing device, a GPS computing device with data pertaining to location, etc.).

Figure 3:
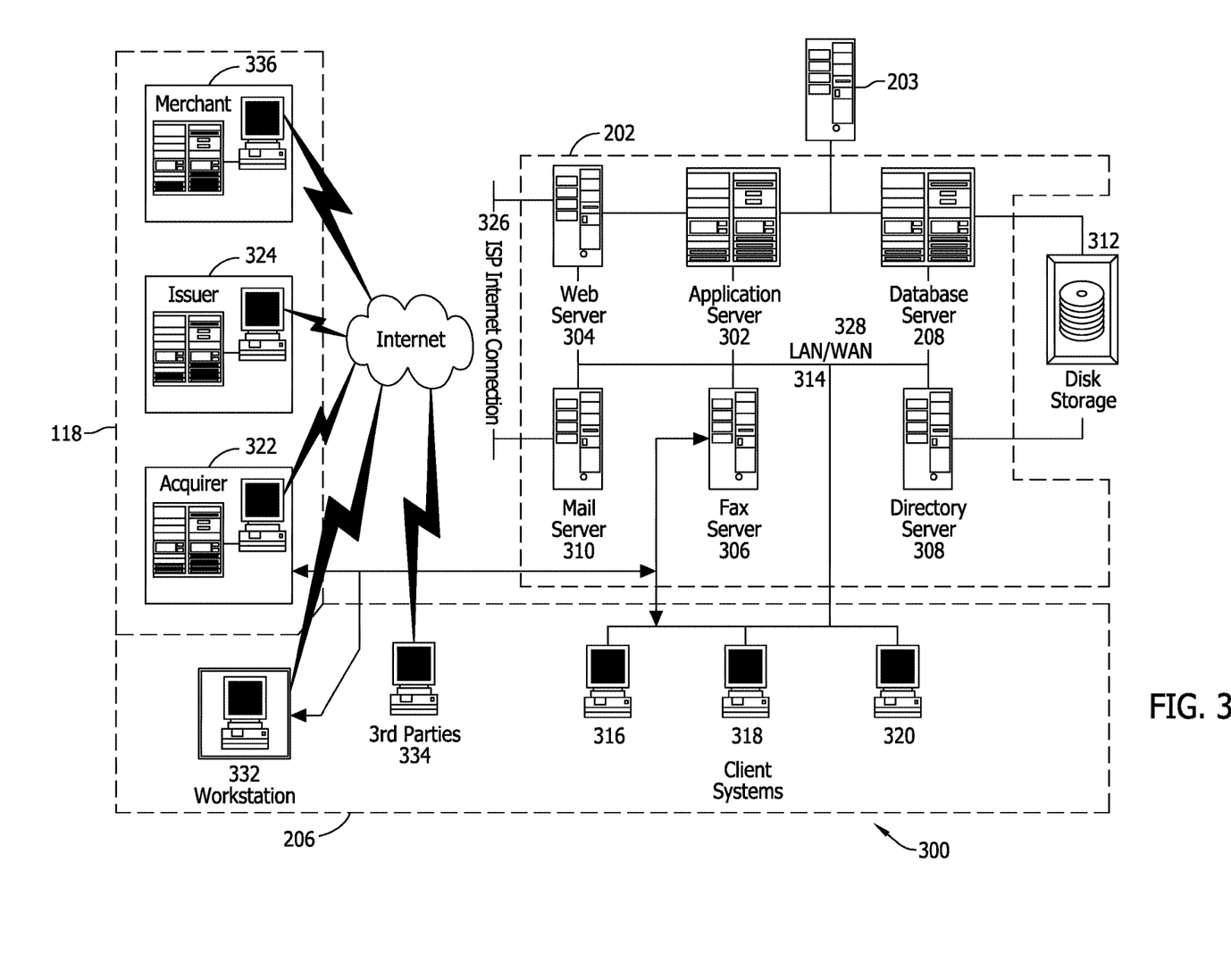
FIG. 3 illustrates an expanded block diagram of an example embodiment of a computer device architecture, including the RCR computing device shown in FIG. 2, used to determine restaurant cost characteristics, in accordance with one embodiment of the present disclosure.

FIG. 3 is an expanded block diagram of an example embodiment of a computer server system architecture of a processing system 300 used to determine restaurant cost characteristics in accordance with one embodiment of the present disclosure. Components in system 300, identical to components of system 200 (shown in FIG. 2), are identified in FIG. 3 using the same reference numerals as used in FIG. 2. System 300 includes RCR computing device 202, payment processing server computing device 204, and client systems 206. In some embodiments, at least one supplemental data computing device 351 is communicatively coupled to payment processing system, for example through the Internet. RCR computing device 202 includes database server 208, an application server 302, a web server 304, a fax server 306, a directory server 308, and a mail server 310. A disk storage unit 312 is coupled to database server 206 and directory server 308. Servers 208, 302, 304, 306, 308, and 310 are coupled in a local area network (LAN) 314. In addition, a system administrator's workstation 316, a user workstation 318, and a supervisor's workstation 320 are coupled to LAN 314. Alternatively, workstations 316, 318, and 320 are coupled to LAN 314 using an Internet link or are connected through an Intranet.

Each workstation, 316, 318, and 320, is a user computer having a web browser. Although the functions performed at the workstations typically are illustrated as being performed at respective workstations 316, 318, and 320, such functions can be performed at one of many personal computers coupled to LAN 314. Workstations 316, 318, and 320 are illustrated as being associated with separate functions only to facilitate an understanding of the different types of functions that can be performed by individuals having access to LAN 314.

RCR computing device 202 is configured to be operated by various individuals including employees 322 and to third parties, e.g., account holders, customers, auditors, developers, consumers, merchants, acquirers, issuers, etc., 334 using an ISP Internet connection 326. The communication in the example embodiment is illustrated as being performed using the Internet, however, any other wide area network (WAN) type communication can be utilized in other embodiments, i.e., the systems and processes are not limited to being practiced using the Internet. In addition, and rather than WAN 328, local area network 314 could be used in place of WAN 328. RCR computing device 202 is also configured to be communicatively coupled to payment systems 118. Payment systems 118 include computer systems associated with acquirer 322, merchant bank 336, interchange network 128, issuer bank 324 (all shown in FIG. 1). Additionally, payments systems 118 may include computer systems associated with acquirer banks and processing banks. Accordingly, payment systems 118 are configured to communicate with RCR computing device 202 and transmit transaction data as discussed below.

In the example embodiment, any authorized individual or entity having a workstation 332 may access system 300. Workstations 332 include personal computers having a web browser. Also, workstations 332 are configured to communicate with RCR computing device 202.

Also, in the example embodiment, web server 304, application server 302, database server 208, and/or directory server 308 may host web applications, and may run on multiple server systems 202. The term "suite of applications," as used herein, refers generally to these various web applications running on server systems 202.

Figure 4:
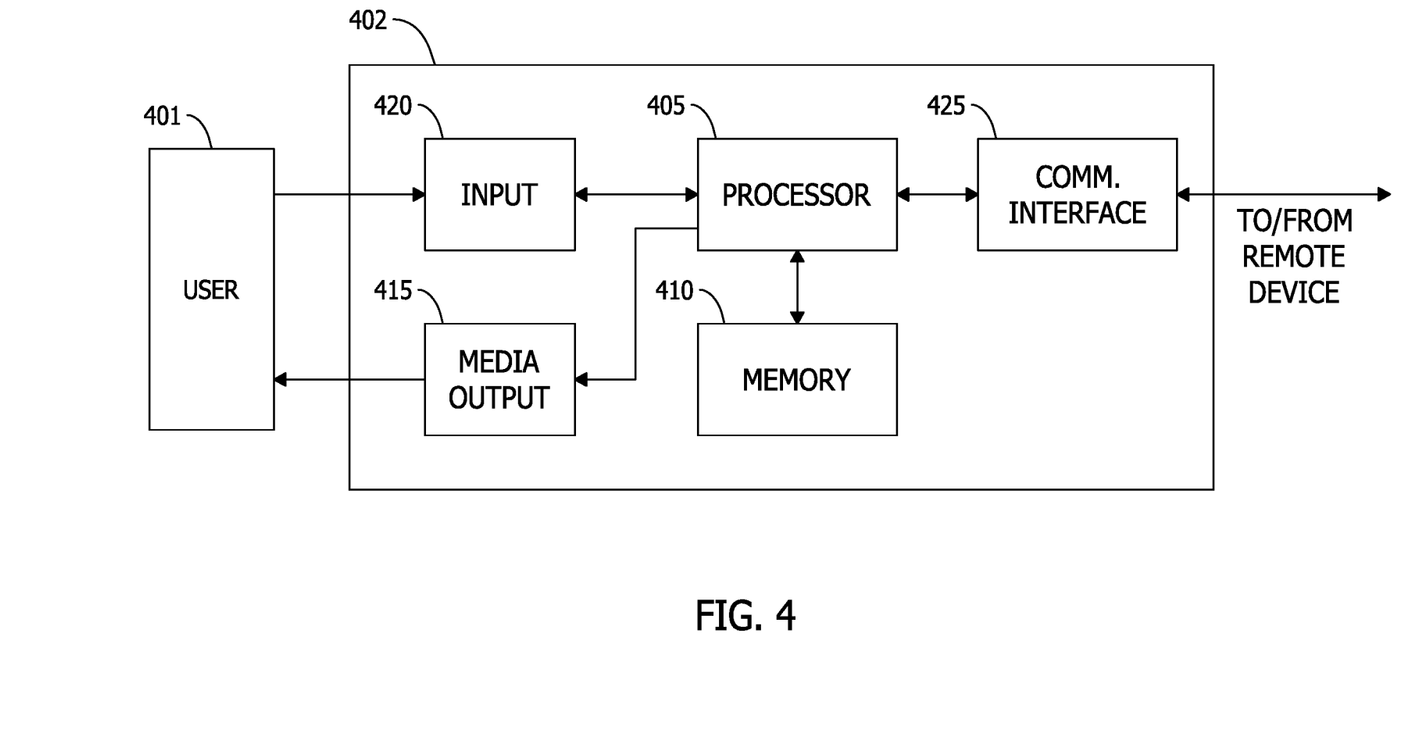
FIG. 4 illustrates an example configuration of a client system shown in FIGS. 2 and 3.

FIG. 4 illustrates an example configuration of a client computing device 402. Client computing device 402 may include, but is not limited to, client systems ("client computing devices") 206, 316, 318, and 320, workstations 330 and 332, computing devices of third parties 334, and supplemental data computing devices 351.

Client computing device 402 includes a processor 405 for executing instructions. In some embodiments, executable instructions are stored in a memory area 410. Processor 405 may include one or more processing units (e.g., in a multi-core configuration). Memory area 410 is any device allowing information such as executable instructions and/or other data to be stored and retrieved. Memory area 410 may include one or more computer-readable media.

Client computing device 402 also includes at least one media output component 415 for presenting information to a user 401 (e.g., a cardholder 122). Media output component 415 is any component capable of conveying information, such as restaurant cost characteristics, to user 401. In some embodiments, media output component 415 includes an output adapter such as a video adapter and/or an audio adapter. An output adapter is operatively coupled to processor 405 and operatively couplable to an output device such as a display device (e.g., a liquid crystal display (LCD), organic light emitting diode (OLED) display, cathode ray tube (CRT), or "electronic ink" display) or an audio output device (e.g., a speaker or headphones).

In some embodiments, client computing device 402 includes an input device 420 for receiving input from user 401. Input device 420 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of media output component 415 and input device 420.

Client computing device 402 may also include a communication interface 425, which is communicatively couplable to a remote device such as server system 202 or a web server operated by a merchant. Communication interface 425 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 410 are, for example, computer-readable instructions for providing a user interface to user 401 via media output component 415 and, optionally, receiving and processing input from input device 420. A user interface may include, among other possibilities, a web browser and client application. Web browsers enable users 401 to display and interact with media and other information typically embedded on a web page or a website hosted by a web server (e.g., web server 304). A client application allows users 401 to interact with an application server (e.g., application server 302).

Figure 5:
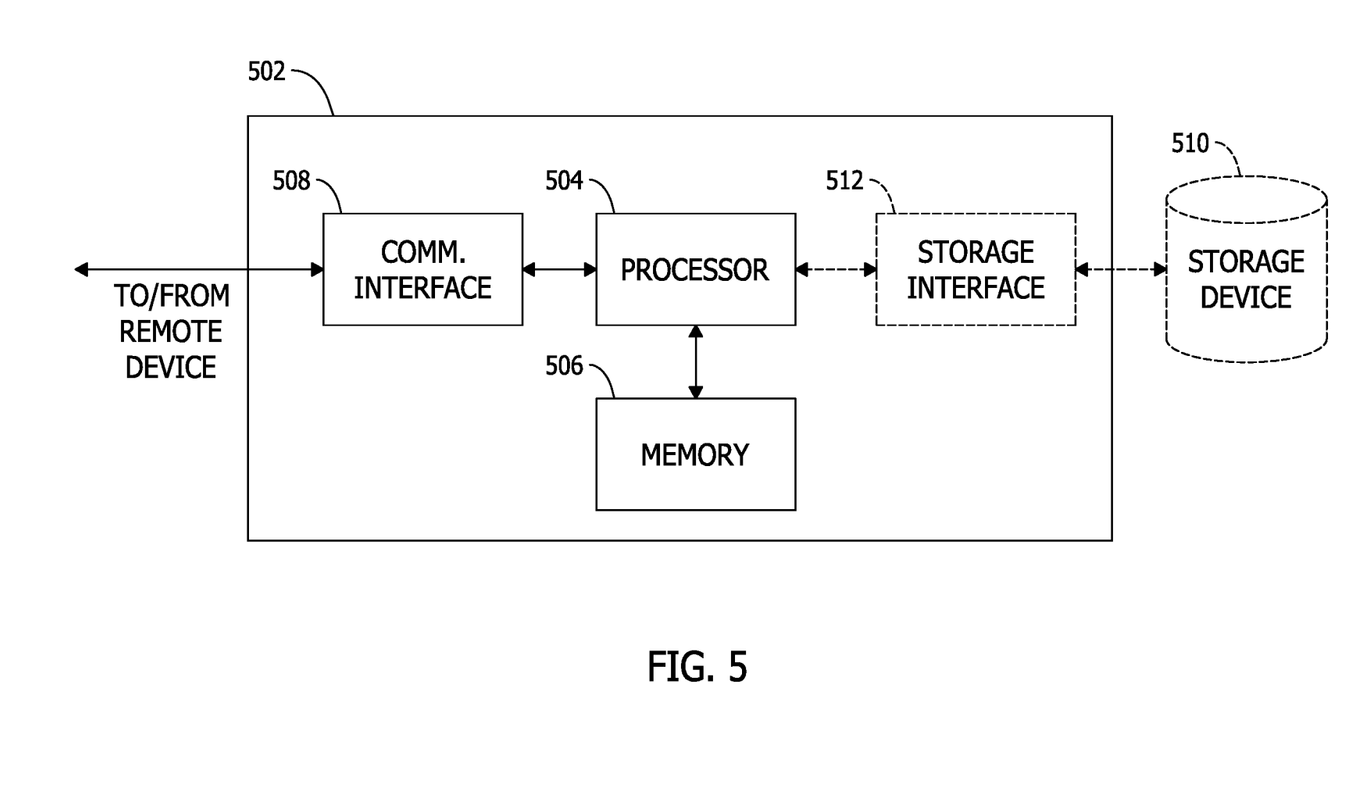
FIG. 5 illustrates an example configuration of the RCR computing device shown in FIGS. 2 and 3

FIG. 5 illustrates an example configuration of a server system 502 such as RCR computing device 202 (shown in FIGS. 2 and 3). Server system 502 may include, but is not limited to, database server 208, application server 302, web server 304, fax server 306, directory server 308, and mail server 310. In the example embodiment, server system 502 receives transaction data and determines and generates restaurant cost ratings, as described below.

Server system 502 includes a processor 504 for executing instructions. Instructions may be stored in a memory area 506, for example. Processor 504 may include one or more processing units (e.g., in a multi-core configuration). The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 504 is operatively coupled to a communication interface 508 such that computing device 502 is capable of communicating with a remote device such as client computing device 402 or another server computing device 502. For example, communication interface 508 may receive requests from client systems 204 via the Internet, as illustrated in FIGS. 2 and 3.

Processor 504 may also be operatively coupled to a storage device 510. Storage device 510 is any computer-operated hardware suitable for storing and/or retrieving data. In some embodiments, storage device 510 is integrated in computing device 502. For example, computing device 502 may include one or more hard disk drives as storage device 510. In other embodiments, storage device 510 is external to computing device 502 and may be accessed by a plurality of computing devices 502. For example, storage device 510 may include multiple storage units such as hard disks or solid state disks in a redundant array of inexpensive disks (RAID) configuration. Storage device 510 may include a storage area network (SAN) and/or a network attached storage (NAS) system.

In some embodiments, processor 504 is operatively coupled to storage device 510 via a storage interface 512. Storage interface 512 is any component capable of providing processor 504 with access to storage device 510. Storage interface 512 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 504 with access to storage device 510.

Memory areas 410 and 506 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are example only, and are thus not limiting as to the types of memory usable for storage of data and/or a computer program.

Figure 6:
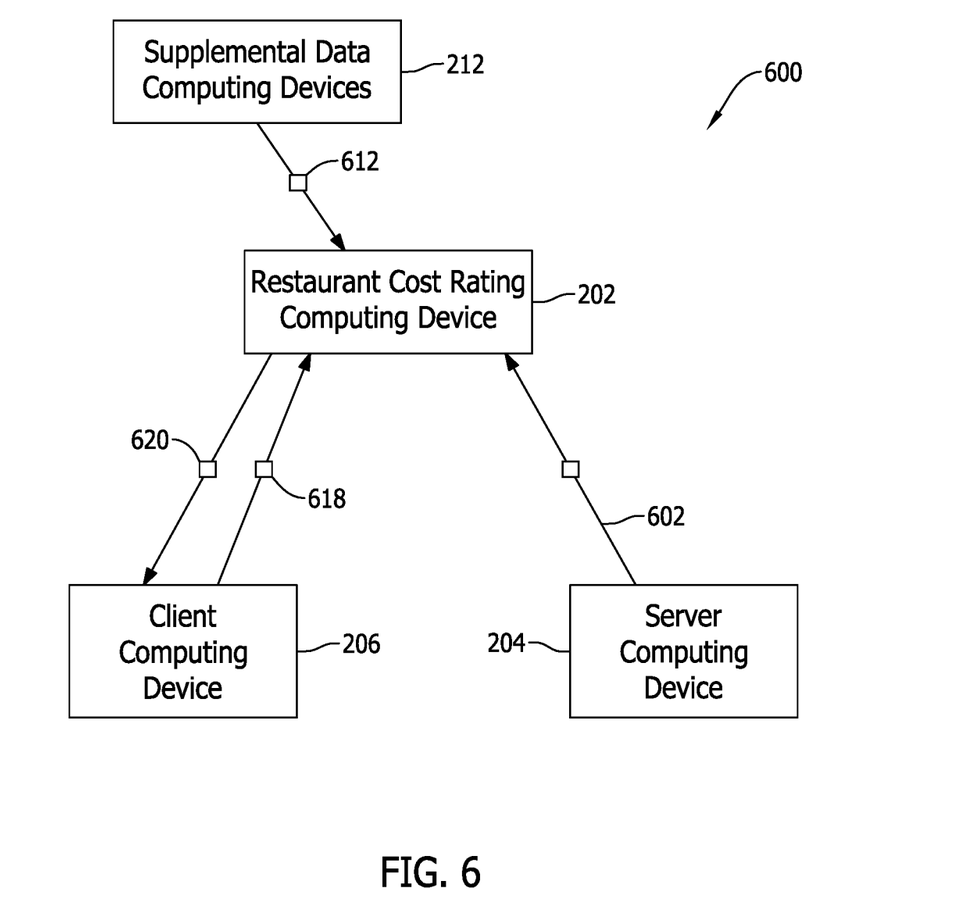
FIG. 6 is an example diagram of signals transmitted between the RCR computing device, the client computing device, and a payment processing server computing device, in accordance with one embodiment of the present disclosure.

FIG. 6 is a diagram 600 of signals transmitted between RCR computing device 202, payment processing server computing device 204, supplemental data computing devices 212, and client computing device 206. RCR computing device 202 receives transaction data signal 602 from payment processing server computing device 204, where transaction data signal 602 includes payment transaction data as described above. In some embodiments, transaction data signal 602 includes, for example, a name of the restaurant, a restaurant location or address, a time and a date of the transaction, and a transaction amount. In some embodiments, payment processing server computing device 204 transmits transaction data signal 602 to RCR computing device 202, and RCR computing device 202 is configured to identify that the merchant is a restaurant based upon a merchant restaurant identification (ID) assigned to each merchant restaurant. In another embodiment, payment processing server computing device 204 detects that transaction data is for a merchant restaurant and transmits the associated transaction data signal 602 to RCR computing device 202.

Additionally, in some embodiments, RCR computing device 202 receives a supplemental data signal 612 from supplemental data computing devices 212. In some embodiments, supplemental data signal includes data (e.g., third-party restaurant ratings, restaurant reviews, cost information, etc.) on restaurants from the third party. In other embodiments, the supplement data includes GPS location information. Supplemental data computing devices 212, in at least some embodiments, are a plurality of different computing devices, each associated with a different source of supplemental data.

A client computing device 206 transmits a restaurant cost rating (RCR) request signal 618 to RCR computing device 202, for example, requesting a restaurant cost rating for a restaurant. In response, RCR computing device 202 transmits a RCR response signal 620 to client computing device 206. RCR response signal 620 includes one or more restaurant cost ratings or other restaurant cost characteristic, and, in at least some embodiments, computer-executable instructions for displaying the restaurant cost ratings in association with a graphical depiction (e.g., a list) of the restaurants.

In response to receiving a RCR request signal 618, for example from client computing device 206, RCR computing device 202 transmits RCR response signal 620 to client computing device 206 to display at least a portion of the restaurant cost characteristics in association with any additional information, thereby enabling a user of client computing device 206 to visually view the information in real time. In some embodiments, the restaurant cost characteristics are constantly updated by the RCR computing device 202, and the updated values are continually displayed on client computing device 206. In one or more embodiments, the RCR computing device 202 transmits alert and/or notification to a mobile computing device 206, as described above.

In a still further embodiment, the RCR computing device is configured to retrieve payment transaction records from database 210 to transmit recommendations to a cardholder based upon at least one of a transaction history of the cardholder, a transaction history for a plurality of cardholders, a location of the cardholder, and restaurant cost ratings. The recommendations are determined based on the transaction data stored in the memory. The recommendations are provided in a variety of formats, such as, but not limited to, text messages, e-mails, and/or notifications transmitted over a wireless communication channel to a mobile computing device of the cardholder. For example, the cardholder may receive an alert and/or notification on a mobile computing device regarding a recommended restaurant along with a restaurant cost rating for the restaurant.

Figure 7:
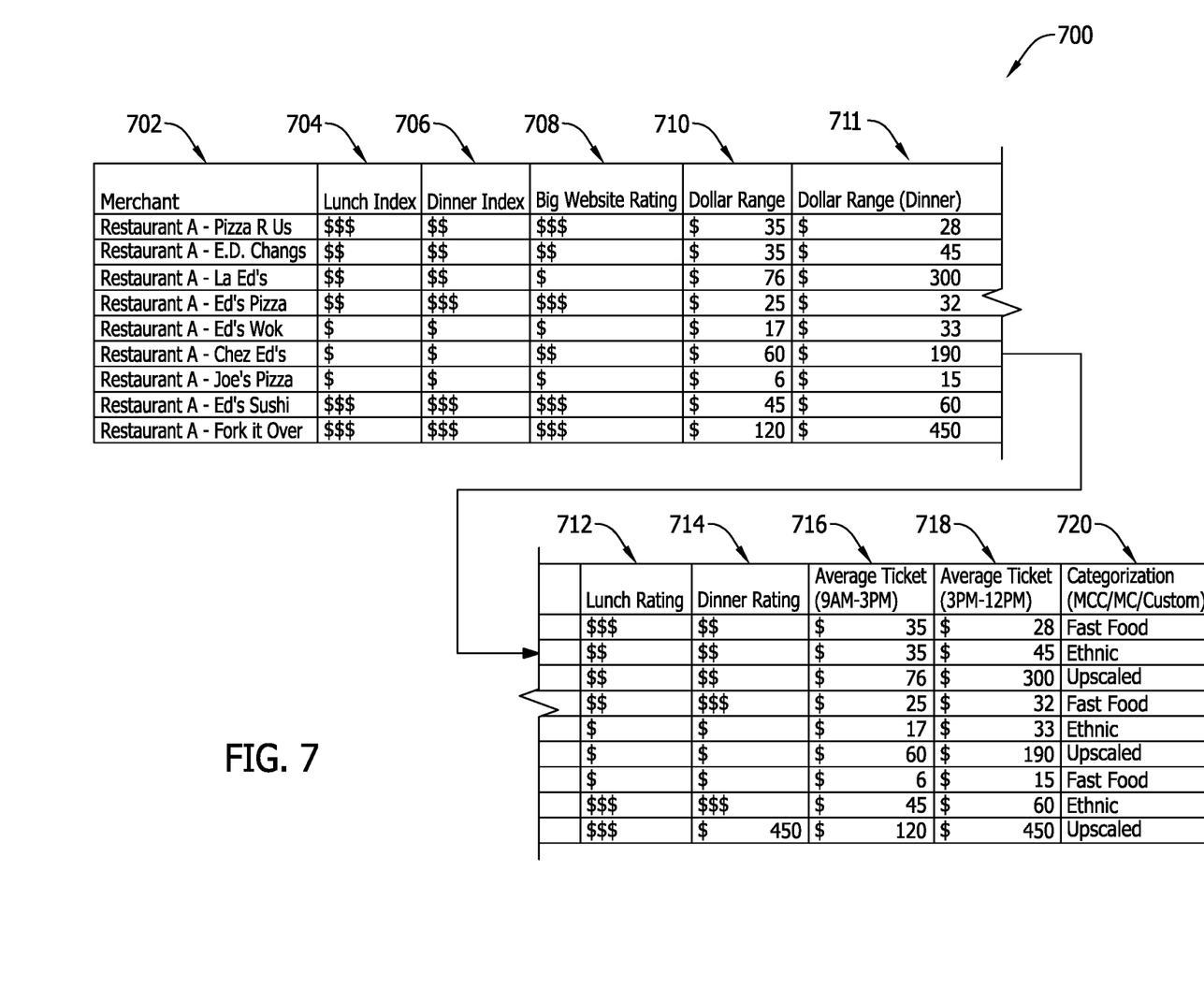
FIG. 7 illustrates an example table of restaurant cost characteristics generated by the RCR computing device shown in FIGS. 2, 3, and 5, in accordance with one embodiment of the present disclosure.

FIG. 7 illustrates an example table 700 of restaurant cost ratings generated and formatted by RCR computing device 202 and possibly displayed on client computing device 206. In particular, the table includes a list of merchant restaurants 702, and each merchant restaurant 702 includes a lunch cost index 704, a dinner cost index 706, a third party rating 708, a dollar range 710, a dollar range for dinner 711, a lunch cost rating 712, a dinner cost rating 714, an average ticket price (i.e., average transaction action) for 9:00 a.m. to 3:00 p.m. 716 and from 3:00 p.m. to 12:00 p.m. 718, and a food categorization 720. Table 700 quickly notifies a user, in real time, that, for example, restaurant B is objectively cheaper than restaurant N. Alternative embodiments could include, but are not limited to, the merchant restaurants defined by city and the restaurant cost ratings, the cost indexes, and the average ticket prices narrowed by different times of day.

Figure 8:
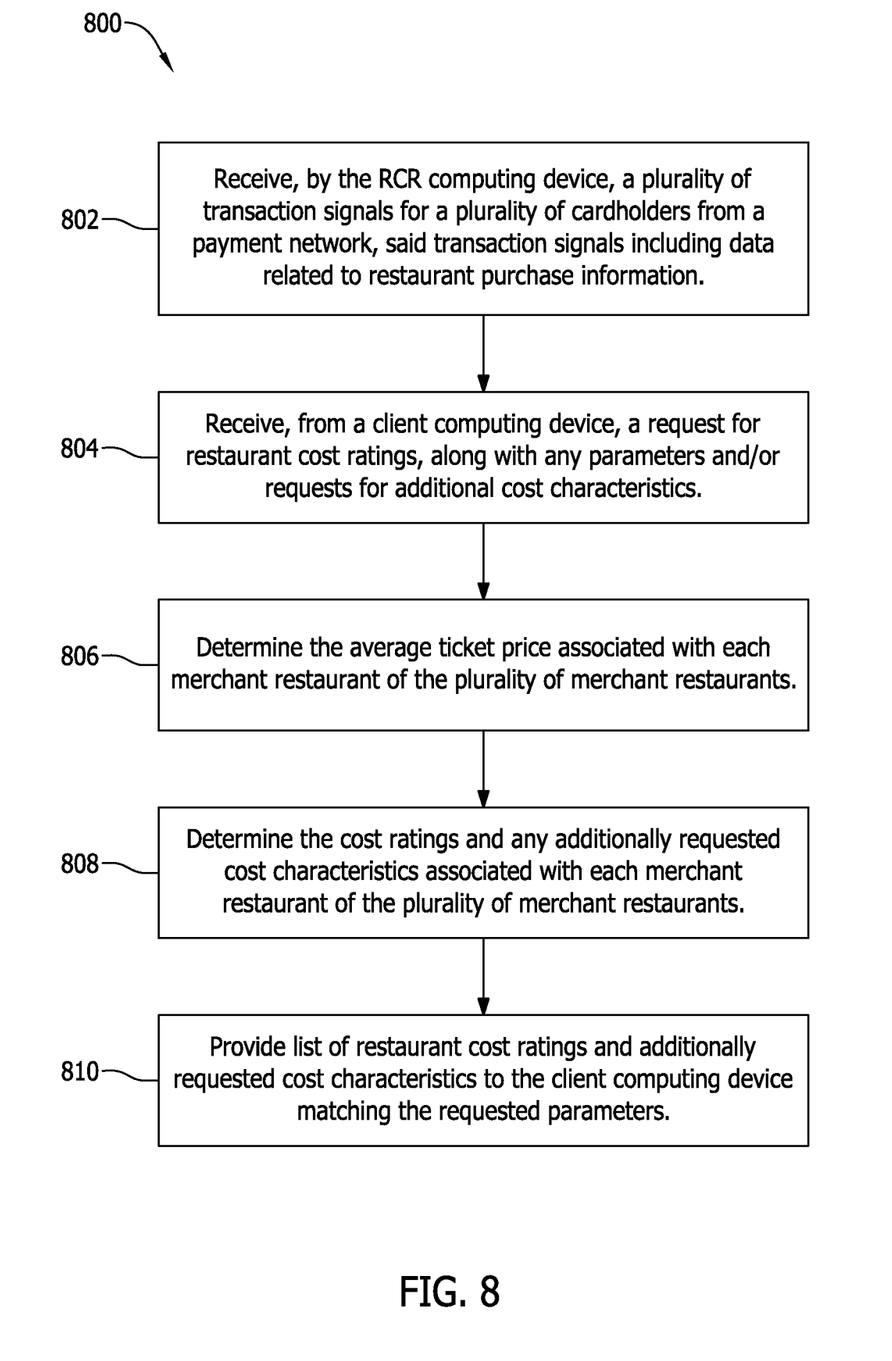
FIG. 8 is a flow diagram showing a method of determining restaurant cost ratings using the RCR computing device shown in FIGS. 2, 3, and 5, in accordance with one embodiment of the present disclosure.

FIG. 8 is a simplified diagram of an example method 800 of determining restaurant cost characteristics from a plurality of transaction signals using a RCR computing device. The RCR computing device receives 802 a plurality of transaction signals (i.e., transaction data) for a plurality of cardholders from a payment network, where the transaction signals include data related to restaurant purchases, including at least a restaurant name, a restaurant ID, and a transaction amount. The transaction data is stored in a memory. The RCR computing device receives 804 a request for one or more restaurant cost characteristics from a client computing device. The request may include additional parameters, such as, but not limited to, a particular location or city, a particular time, and/or a particular season. The request can also include additional characteristics, such as, but not limited to, dollar ranges, average ticket prices, average transaction sizes, food categorization, cost indexes, and/or cost indexes for a particular time or season. To determine a restaurant cost rating, the RCR computing device determines 806 an average ticket price associated with each merchant restaurant of the plurality of merchant restaurants pursuant to any defined parameters. The RCR computing device then determines 808 the restaurant cost ratings, and any additionally requested characteristics, associated with each merchant restaurant of the plurality of merchant restaurants pursuant to any defined parameters. The RCR computing device transmits 810 a list of merchant restaurants along with the restaurant cost ratings and any other requested characteristics to the client computing device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 405, 504, including RAM memory, ROM memory, EPROM memory, EEPROM memory, and non-volatile RAM (NVRAM) memory. The above memory types are example only, and are thus not limiting as to the types of memory usable for storage of a computer program.

As will be appreciated based on the foregoing specification, the above-discussed embodiments of the disclosure may be implemented using computer programming or engineering techniques including computer software, firmware, hardware or any combination or subset thereof. Any such resulting computer program, having computer-readable and/or computer-executable instructions, may be embodied or provided within one or more computer-readable media, thereby making a computer program product, i.e., an article of manufacture, according to the discussed embodiments of the disclosure. These computer programs (also known as programs, software, software applications or code) include machine instructions for a programmable processor, and can be implemented in a high-level procedural and/or object-oriented programming language, and/or in assembly/machine language. As used herein, the terms "machine-readable medium," "computer-readable medium," and "computer-readable media" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium," "computer-readable medium," and "computer-readable media," however, do not include transitory signals (i.e., they are "non-transitory"). The term "machine-readable signal" refers to any signal used to provide machine instructions and/or data to a programmable processor.

The above-described embodiments of a method and system for generating a restaurant cost ratings utilize records of financial transactions processed by a payment network to provide a third party, such as a person or a business, with objective, real time information regarding the cost of restaurants, and associated information that would be difficult to obtain without by other any means and researching information from multiple different sources.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for determining objective restaurant cost characteristics for one or more merchant restaurants, the method implemented using a restaurant cost ratings (RCR) computing device communicatively coupled between a payment network and a remote computing device, the RCR computing device further communicatively coupled to at least one supplemental data computing device, the RCR computing device including a processor and a memory, said method comprising:

receiving, from the payment network, transaction data for a plurality of restaurant transactions, wherein the payment network is configured to process payment card transactions using a set of proprietary communication standards for the exchange of transaction data and the settlement of funds between financial institutions that are members of the payment network;

storing, in the memory, the transaction data for the plurality of restaurant transactions, the RCR computing device configured to use the transaction data to determine restaurant cost characteristics for one or more merchant restaurants;

receiving, from the at least one supplemental data computing device, supplemental data associated with the one or more merchant restaurants, the supplemental data including at least one of restaurant ratings, restaurant reviews, cost information, and GPS location information;

storing, in the memory, the supplemental data;

receiving, from the remote computing device, by the RCR computing device, a request for one or more restaurant cost characteristics for one or more merchant restaurants;

determining, by the RCR computing device, the one or more restaurant cost characteristics for the one or more merchant restaurants based on the transaction data and the supplemental data stored in the memory; and transmitting, by the RCR computing device, the one or more restaurant cost characteristics for the one or more merchant restaurants to the remote computing device, wherein the RCR computing device controls the remote computing device by transmitting the one or more restaurant cost characteristics as an alert message that activates the remote computing device to cause the one or more restaurant cost characteristics to be displayed on the remote computing device, thereby determining objective restaurant cost characteristics in real-time.

2. The method in accordance with claim 1, further comprising:

identifying, by the RCR computing device, candidate transaction data resulting from transactions by cardholders at merchant restaurants, the candidate transaction data identified based on merchant restaurant identifications; and storing, by the RCR computing device into the memory, the candidate transaction data, wherein the candidate transaction data includes for each transaction at least a merchant restaurant identification, a name of a merchant restaurant, and a transaction amount.

3. The method in accordance with claim 1, wherein the transaction data for each restaurant transaction includes one or more of a merchant restaurant name, a merchant restaurant identification, a transaction amount, a party size, a transaction size, a time and a date of the transaction, a food category, a restaurant type, and a location of the merchant restaurant.

4. The method in accordance with claim 1, wherein the one or more restaurant cost characteristics includes one or more of a merchant restaurant name, a merchant restaurant identification, a restaurant cost rating, an average transaction amount, a food category, a restaurant type, a location of the merchant restaurant, a transaction dollar range, an average transaction size, an average party size, and a cost index.

5. The method in accordance with claim 1, further comprising transmitting, by the RCR computing device, the one or more restaurant cost characteristics as a data signal to the remote computing device over a wireless communication channel.

6. The method in accordance with claim 5, further comprising transmitting, by the RCR computing device, the data signal to the remote computing device when the remote computing device is determined to be in a predefined proximity to a merchant restaurant.

7. The method in accordance with claim 1, further comprising filtering, by the RCR computing device, the one or more restaurant cost characteristics for the one or more merchant restaurants based on a filtering criteria included in the request, the filtering criteria including one or more of a time of day, a season, a city, a food category, a restaurant type, a restaurant cost rating, an average transaction amount, or a cost index.

8. A restaurant cost ratings (RCR) computing device for determining objective restaurant cost characteristics for one or more merchant restaurants, the RCR computing device communicatively coupled between a payment network and a remote computing device, the RCR computing device further communicatively coupled to at least one supplemental data computing device, the RCR computing device comprising:

a processor; and a memory coupled to said processor, said processor configured to:

receive, from the payment network, transaction data for a plurality of restaurant transactions, wherein the payment network is configured to process payment card transactions using a set of proprietary communication standards for the exchange of transaction data and the settlement of funds between financial institutions that are members of the payment network;

store, in the memory, the transaction data for the plurality of restaurant transactions, said processor configured to use the transaction data to determine restaurant cost characteristics for one or more merchant restaurants;

receive, from the at least one supplemental data computing device, supplemental data associated with the one or more merchant restaurants, the supplemental data including at least one of restaurant ratings, restaurant reviews, cost information, and GPS location information;

store, in the memory, the supplemental data;

receive, from the remote computing device, a request for one or more restaurant cost characteristics for one or more merchant restaurants;

determine the one or more restaurant cost characteristics for the one or more merchant restaurants based on the transaction data and the supplemental data stored in the memory; and transmit the one or more restaurant cost characteristics for the one or more merchant restaurants to the remote computing device, wherein the RCR computing device controls the remote computing device by transmitting the one or more restaurant cost characteristics as an alert message that activates the remote computing device to cause the one or more restaurant cost characteristics to be displayed on the remote computing device, thereby determining objective restaurant cost characteristics in real-time.

9. The RCR computing device of claim 8, wherein said processor is further configured to:

identify candidate transaction data resulting from transactions by cardholders at merchant restaurants, the candidate transaction data identified based on merchant restaurant identifications; and store, into the memory, the candidate transaction data, wherein the candidate transaction data includes for each transaction at least a merchant restaurant identification, a name of a merchant restaurant, and a transaction amount.

10. The RCR computing device of claim 8, wherein the transaction data for each restaurant transaction includes one or more of a merchant restaurant name, a merchant restaurant identification, a transaction amount, a party size, a transaction size, a time and a date of the transaction, a food category, a restaurant type, and a location of the merchant restaurant.

11. The RCR computing device of claim 8, wherein the one or more restaurant cost characteristics includes one or more of a merchant restaurant name, a merchant restaurant identification, a restaurant cost rating, an average transaction amount, a food category, a restaurant type, a location of the merchant restaurant, a transaction dollar range, an average transaction size, an average party size, and a cost index.

12. The RCR computing device of claim 8, wherein said processor is further configured to transmit the one or more restaurant cost characteristics as a data signal to the remote computing device over a wireless communication channel.

13. The RCR computing device of claim 12, wherein said processor is further configured to transmit the data signal to the remote computing device when the remote computing device is determined to be in a predefined proximity to a merchant restaurant.

14. The RCR computing device of claim 8, wherein said processor is further configured to filter the one or more restaurant cost characteristics for the one or more merchant restaurants based on a filtering criteria included in the request, the filtering criteria including one or more of a time of day, a season, a city, a food category, a restaurant type, a restaurant cost rating, an average transaction amount, or a cost index.

15. Non-transitory computer-readable storage media having computer-executable instructions embodied thereon, wherein, when executed by at least one processor associated with a restaurant cost ratings (RCR) computing device communicatively coupled between a payment network and a remote computing device, the RCR computing device further communicatively coupled to at least one supplemental data computing device, the computer-executable instructions cause the processor to:

receive, from the payment network, transaction data for a plurality of restaurant transactions, wherein the payment network is configured to process payment card transactions using a set of proprietary communication standards for the exchange of transaction data and the settlement of funds between financial institutions that are members of the payment network;

store, in the memory, the transaction data for the plurality of restaurant transactions, wherein the computer-executable instructions cause the processor to use the transaction data to determine restaurant cost characteristics for one or more merchant restaurants;

receive, from the at least one supplemental data computing device, supplemental data associated with the one or more merchant restaurants, the supplemental data including at least one of restaurant ratings, restaurant reviews, cost information, and GPS location information;

store, in the emory, the supplemental data;

receive, from the remote computing device, a request for one or more restaurant cost characteristics for one or more merchant restaurants;

determine the one or more restaurant cost characteristics for the one or more merchant restaurants based on the transaction data and the supplemental data stored in the memory; and transmit the one or more restaurant cost characteristics for the one or more merchant restaurants to the remote computing device, wherein the RCR computing device controls the remote computing device by transmitting the one or more restaurant cost characteristics as an alert message that activates the remote computing device to cause the one or more restaurant cost characteristics to be displayed on the remote computing device, thereby determining objective restaurant cost characteristics in real-time.

16. The non-transitory computer-readable storage media in accordance with claim 15, wherein the computer-executable instructions cause the processor to:

identify candidate transaction data resulting from transactions by cardholders at merchant restaurants, the candidate transaction data identified based on merchant restaurant identifications; and store, into the memory, the candidate transaction data, wherein the candidate transaction data includes for each transaction at least a merchant restaurant identification, a name of a merchant restaurant, and a transaction amount.

17. The non-transitory computer-readable storage media in accordance with claim 15, wherein the transaction data for each restaurant transaction includes one or more of a merchant restaurant name, a merchant restaurant identification, a transaction amount, a party size, a transaction size, a time and a date of the transaction, a food category, a restaurant type, and a location of the merchant restaurant.

18. The non-transitory computer-readable storage media in accordance with claim 15, wherein the one or more restaurant cost characteristics includes one or more of a merchant restaurant name, a merchant restaurant identification, a restaurant cost rating, an average transaction amount, a food category, a restaurant type, a location of the merchant restaurant, a transaction dollar range, an average transaction size, an average party size, and a cost index.

19. The non-transitory computer-readable storage media in accordance with claim 15, wherein the computer-executable instructions cause the processor to transmit the one or more restaurant cost characteristics as a data signal to the remote computing device over a wireless communication channel.

20. The non-transitory computer-readable storage media in accordance with claim 19, wherein the computer-executable instructions cause the processor to transmit the data signal to the remote computing device when the remote computing device is determined to be in a predefined proximity to a merchant restaurant.

21. The non-transitory computer-readable storage media in accordance with claim 15, wherein the computer-executable instructions cause the processor to filter the one or more restaurant cost characteristics for the one or more merchant restaurants based on a filtering criteria included in the request, the filtering criteria including one or more of a time of day, a season, a city, a food category, a restaurant type, a restaurant cost rating, an average transaction amount, or a cost index.

* * * * *